(12) United States Patent
Song

(10) Patent No.: US 9,952,730 B2
(45) Date of Patent: Apr. 24, 2018

(54) TOUCH PANEL

(71) Applicant: DONGWOO FINE-CHEM CO., LTD., Iksan-si, Jeollabuk-do (KR)

(72) Inventor: Byung Hoon Song, Hwaseong-si (KR)

(73) Assignee: DONGWOO FINE-CHEM CO., LTD., Iksan-si (KR)

( * ) Notice: Subject to any disclaimer, the term of this patent is extended or adjusted under 35 U.S.C. 154(b) by 0 days.

(21) Appl. No.: 15/081,862

(22) Filed: Mar. 26, 2016

(65) Prior Publication Data

US 2016/0282992 A1    Sep. 29, 2016

(30) Foreign Application Priority Data

Mar. 27, 2015 (KR) .......... 10-2015-0043400

(51) Int. Cl.
*G06F 3/041* (2006.01)
*G06F 3/044* (2006.01)

(52) U.S. Cl.
CPC .... *G06F 3/044* (2013.01); *G06F 2203/04102* (2013.01)

(58) Field of Classification Search
CPC ............... G06F 3/044; G06F 3/041; G06F 2203/04103; G06F 3/045; G06F 3/0412; G06F 2203/04102; G06F 2203/04112; G06F 3/0416; G06F 2203/04111; G06F 1/1652; G06F 1/16; G06F 1/1601; G06F 1/1637; G06F 1/1626; G06F 1/1694; G06F 2203/04104; G06F 2203/04113; G06F 3/147; G06F 3/047; G06F 1/163; G02F 1/13338; G02F 1/13452; G02F 1/133305; G02F 1/13439; G02F 1/134309; G02F 1/1368
USPC .................................. 345/173–181
See application file for complete search history.

(56) References Cited

U.S. PATENT DOCUMENTS 9,081,431 B2 * 7/2015 Kung ............ G06F 3/041
2012/0262409 A1 * 10/2012 Tsai ............ G06F 3/044
                                                    345/174

* cited by examiner

Primary Examiner — Duc Q Dinh
(74) Attorney, Agent, or Firm — Maschoff Brennan

(57) ABSTRACT

A flexible touch panel having a bending region which is bendable and a flat region, includes: a plurality of first unit conductive patterns formed in the flat region; and a plurality of second unit conductive patterns formed in the bending region, and the second unit conductive pattern has a smaller width than the first unit conductive pattern.

9 Claims, 6 Drawing Sheets

[Fig. 1]
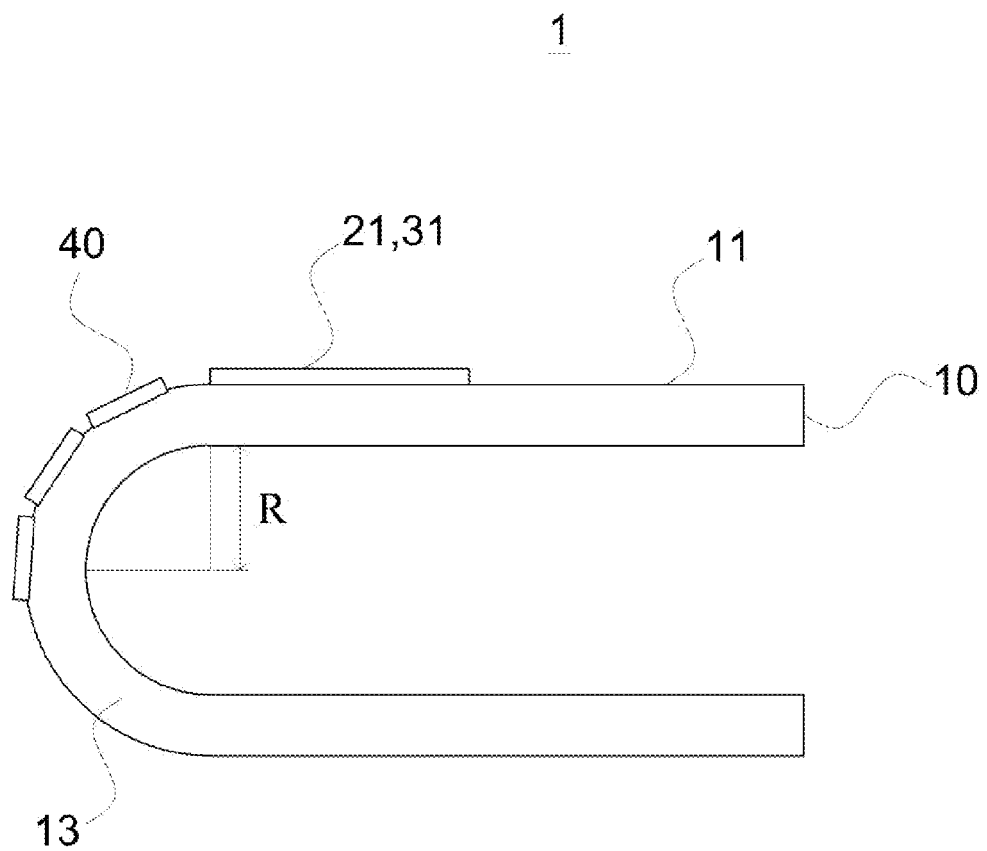

[Fig. 2]
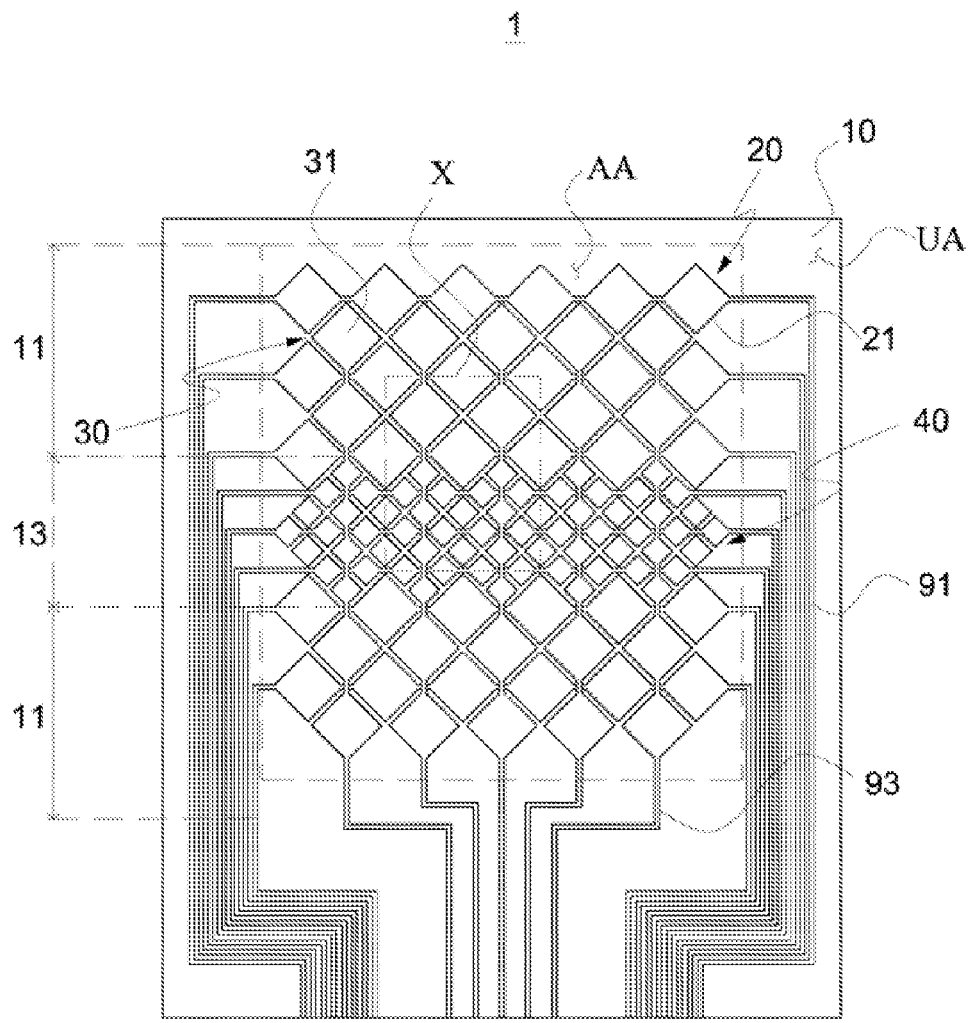

[Fig. 3]
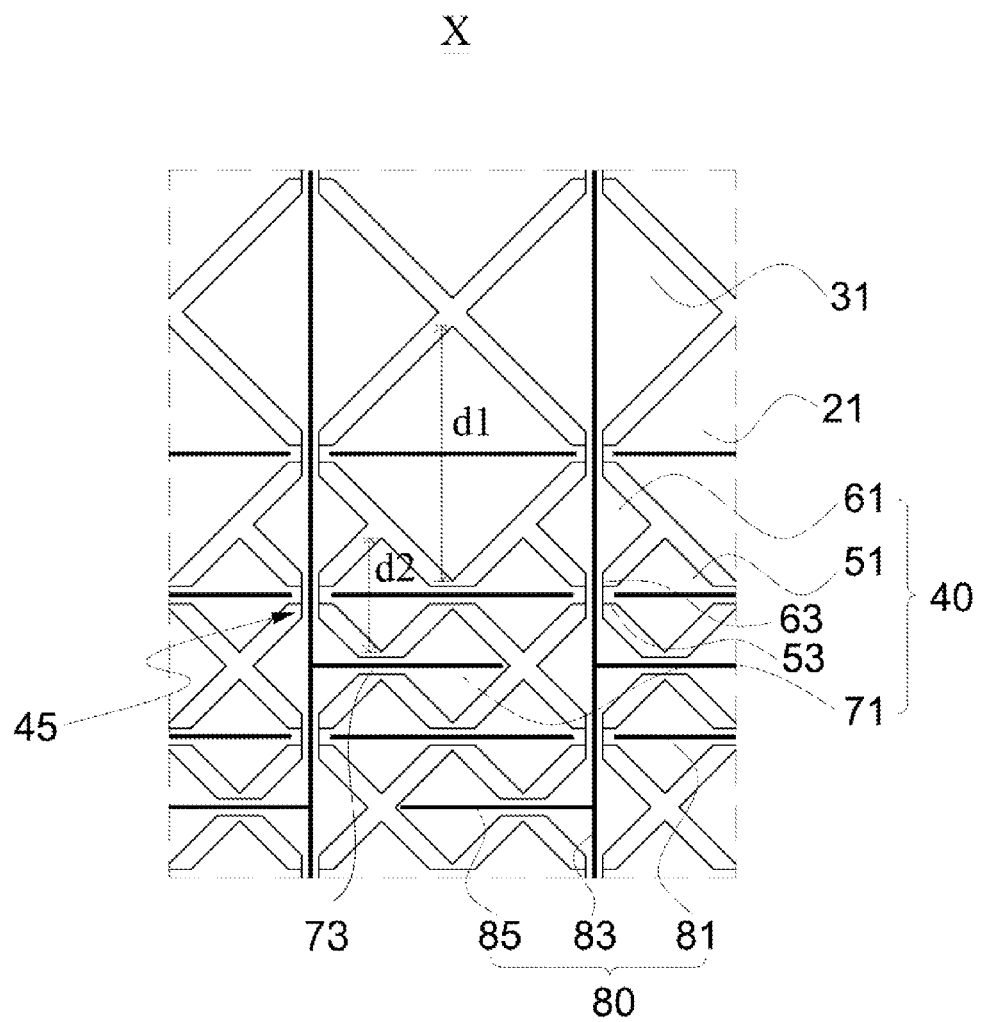

[Fig. 4]
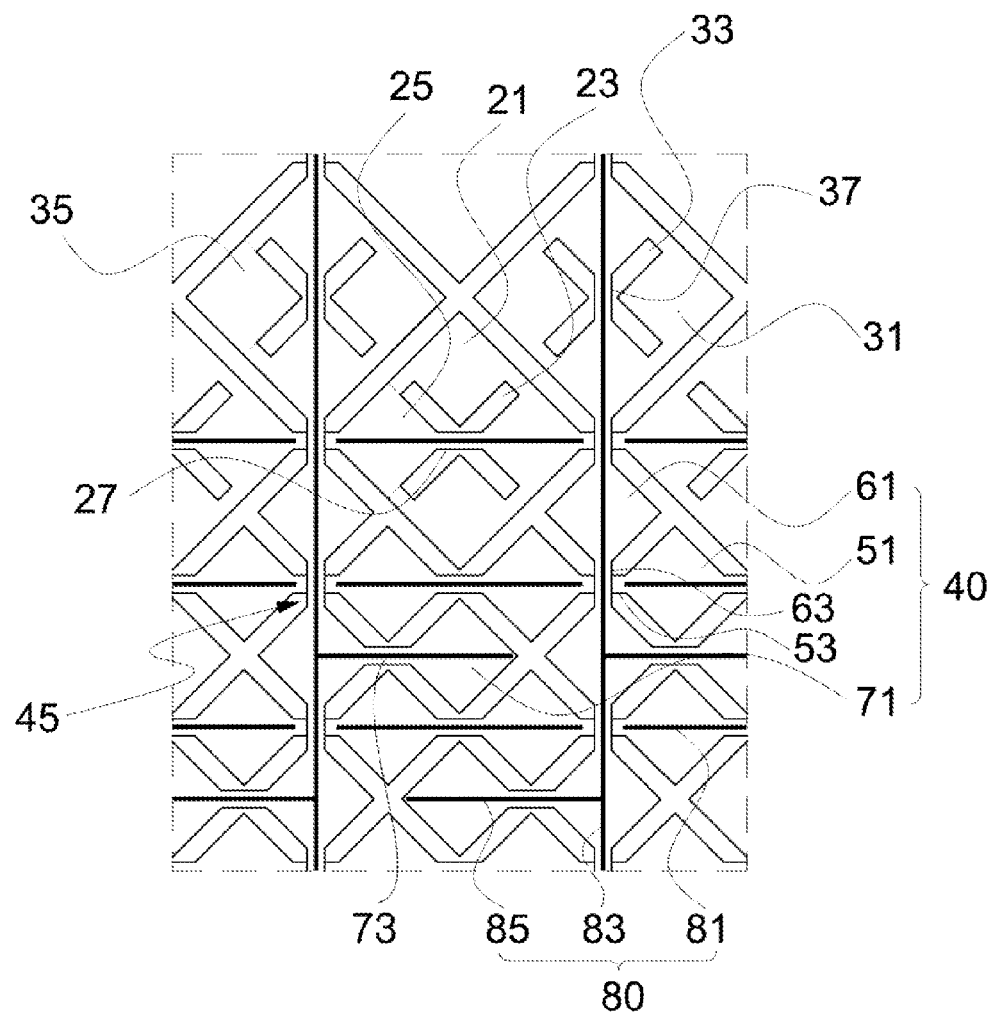

[Fig. 5]
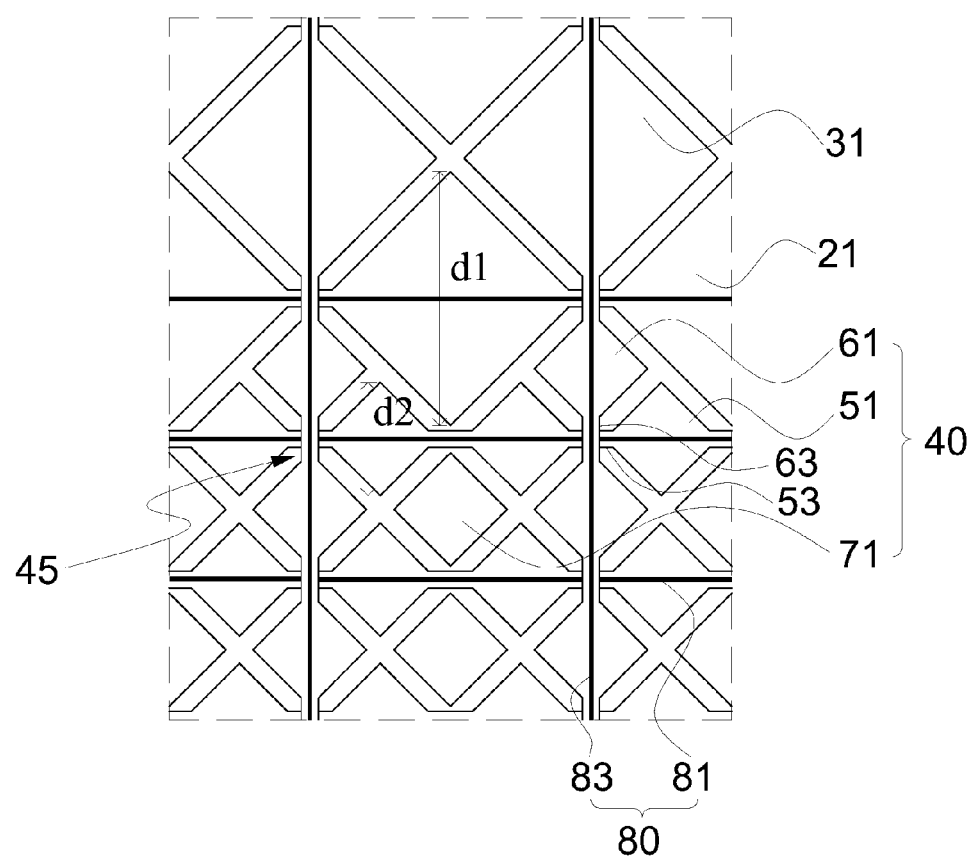

[Fig. 6]
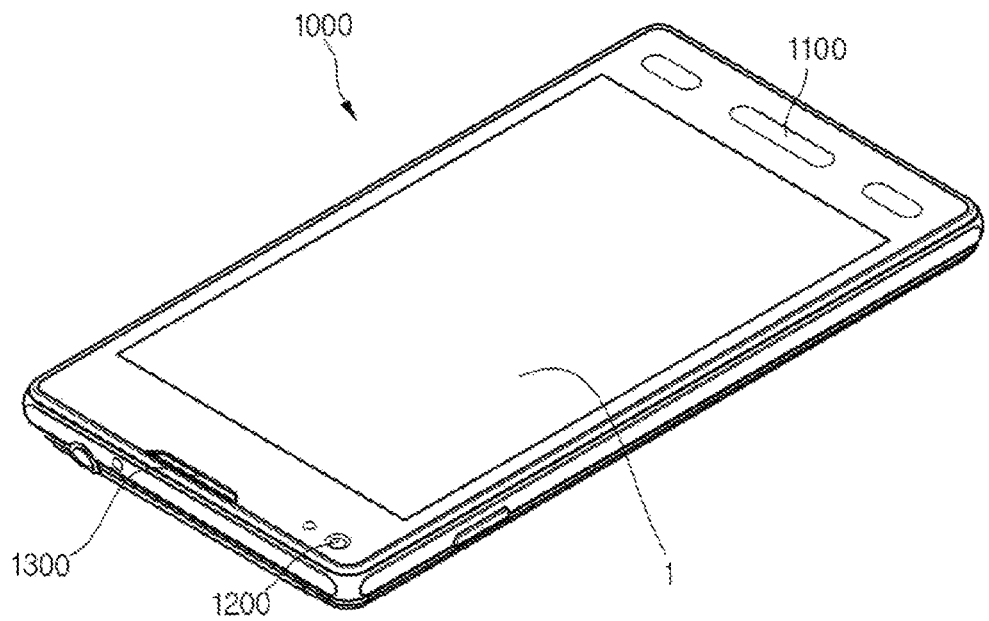

TOUCH PANEL

CROSS-REFERENCE TO RELATED APPLICATION

This application claims priority to and the benefit of Korean Patent Application No. 10-2015-0043400, filed on Mar. 27, 2015, the disclosure of which is incorporated herein by reference in its entirety.

BACKGROUND

1. Field of the Invention

Embodiments of the present invention relate to a touch panel.

2. Discussion of Related Art

Recently, a touch panel inputting in a method of touching an input device such as a finger or a stylus, etc. on an image displayed on a display device is applied to various electronic products.

The touch panels are largely classified as a touch panel of a resistive film type and a touch panel of a capacitive type. In the touch panel of the resistive film type, as a glass and an electrode are short-circuited by a pressure of an input device, a location is detected. In the touch panel of the capacitive type, a location is detected by sensing a change of a capacitance between electrodes when being touched by a finger.

Performance of the touch panel of the resistive type may be decreased by repetitive use, and a scratch may be generated on the touch panel. Accordingly, a concern on the touch panel of the capacitive type having an excellent durability and a long lifecycle is being increased.

The touch panel of the capacitive type defines an effective region in which a touch command is able to be input, and an ineffective region outside the effective region. An electrode pattern formed in the effective region is formed of a transparent conductive material to transmit light from the display device.

Recently, a flexible display device which is bendable and foldable has been developed, and a bendable touch panel is required in order to implement the display device. When the touch panel is bent, there is a problem in which a crack occurs in the touch panel and thus a defect is generated in the touch panel.

SUMMARY OF THE INVENTION

The present invention is directed to a touch panel capable of preventing a crack in a bending region.

According to an aspect of the present invention, there is provided a flexible touch panel having a bending region which is bendable and a flat region, includes: a plurality of first unit conductive patterns formed in the flat region; and a plurality of second unit conductive patterns formed in the bending region, and the second unit conductive pattern has a smaller width than the first unit conductive pattern.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 1 is a side view for describing a touch panel according to a first embodiment of the present invention;

FIG. 2 is a planar view illustrating the touch panel according to the first embodiment of the present invention;

FIG. 3 is an enlarged view of region X shown in FIG. 2;

FIG. 4 is an enlarged view illustrating a touch panel according to a second embodiment of the present invention;

FIG. 5 is an enlarged view illustrating a touch panel according to a third embodiment of the present invention; and FIG. 6 is a perspective view illustrating a display device to which the touch panel is applied according to an embodiment of the present invention.

DETAILED DESCRIPTION OF EXEMPLARY EMBODIMENTS

Hereinafter, embodiments of the present invention will be described in detail below with reference to the accompanying drawings. The spirit and scope of the present invention is not limited to the embodiments, and it should be apparent to those skilled in the art that another regressive invention or another embodiment included in the spirit and scope of the present invention is easily proposed by an addition, change, deletion, etc. of another component within the spirit and scope of the present invention and is included in the spirit and scope of the present invention.

Further, components having the same function within the same spirit and scope shown in the drawings according to embodiments will be described using the same reference numeral.

In a flexible touch panel having a bending region which is bendable and a flat region, comprising: a plurality of first unit conductive patterns formed in the flat region; and a plurality of second unit conductive patterns formed in the bending region, wherein the second unit conductive pattern has a smaller width than the first unit conductive pattern.

wherein the bending region is bended to have a radius of curvature R.

wherein the second unit conductive pattern has a width of $\pi R/10$ to $\pi R/2$.

wherein the plurality of second unit conductive patterns comprises a plurality of first sub-patterns arranged in a first direction, and a plurality of second sub-patterns arranged in a second direction.

The flexible touch panel further comprising: a third sub-pattern arranged in the first direction between the second sub-patterns.

wherein the third sub-pattern is connected to an adjacent second sub-pattern.

wherein the third sub-pattern acts as a dummy electrode.

wherein the first unit conductive pattern comprises a plurality of divided patterns divided to have a size corresponding to the second unit conductive pattern.

wherein each of the divided patterns are electrically connected to adjacent divided patterns by a connection portion.

wherein the connection portion is formed to have a plurality of portions between adjacent divided patterns.

wherein the plurality of divided patterns and the connection portion are integrally formed.

The flexible touch panel further comprising: an auxiliary electrode formed on the first unit conductive pattern.

The flexible touch panel further comprising: an auxiliary electrode formed on the second unit conductive pattern.

Hereinafter, the touch panel according to embodiments of the present invention with reference to the accompanying drawings.

FIG. 1 is a side view for describing a touch panel according to a first embodiment of the present invention.

Referring to FIG. 1, a touch panel 1 according to the first embodiment of the present invention may include a substrate 1.

The substrate 10 may have a bent structure. A predetermined region of the substrate 10 may be formed as a structure having a curvature.

The substrate 10 may include flat regions 11, and a bending region 13. The flat regions 11 may mean a region which is flat without a curvature, and the bending region 13 may be defined as a region having the curvature.

The flat regions 11 may be formed at both sides of the bending region 13. The flat regions 11 located at both sides of the bending region 13 may be located to face each other.

The bending region 13 may have a constant radius of curvature R. The bending region 13 may be formed in a semicircular shape when viewed from the side.

An electrode pattern may be formed in the flat regions 11 and the bending region 13.

Main patterns 21 and 31 may be formed in the flat regions 11, and sub-patterns 40 may be formed in the bending region 13. The main patterns 21 and 31 and the sub-patterns 40 may be formed to have sizes different from each other.

FIG. 2 is a planar view illustrating the touch panel according to the first embodiment of the present invention, and FIG. 3 is an enlarged view of region X shown in FIG. 2.

Referring to FIGS. 2 and 3, the touch panel 1 according to the first embodiment may include an effective region AA, and an ineffective region UA.

The touch panel 1 shown in FIG. 2 is in a planar view illustrating a state in which the bending region 13 shown in FIG. 1 is unfolded.

The effective region AA shown in FIG. 2 may mean a region in which it is possible to input a touch command of a user, and the ineffective region UA may mean a region in which it is not possible to input a touch command of the user since the region is deactivated even when the user touches the region.

When the touch panel 1 is attached to a display panel and used, the effective region AA and the ineffective region UA of the touch panel 1 may correspond to a display region and a non-display region. The display region may be a region which displays an image, and the non-display region may be a region which does not display an image. Accordingly, the effective region AA of the touch panel may be a region which is able to transmit light, and the ineffective region UA of the touch panel may be a region which does not transmit light.

As shown in FIGS. 1 and 2, the touch panel 1 may include the flat regions 11 and the bending region 13. The flat regions 11 may be located at both sides of the bending region 13. The bending region 13 may be located between the flat regions 11.

A plurality of electrode patterns may be formed in the effective region AA. A plurality of first sensing electrodes 20 and a plurality of second sensing electrodes 30 may be formed in the effective region AA of the substrate 10.

In FIG. 3 which is an enlarged diagram of the X region shown in FIG. 2, the plurality of first sensing electrodes 20 may include a plurality of first main patterns 21 and a plurality of first sub-patterns 51, and the plurality of second sensing electrodes 30 may include a plurality of second main patterns 31 and a plurality of second sub-patterns 61. The plurality of first main patterns 21 and the plurality of first sub-patterns 51 may be arranged in a first direction, and the plurality of second main patterns 31 and the plurality of second sub-patterns 61 may be arranged in a second direction. The first direction and the second direction may be directions intersecting each other.

Each of the first main patterns 21 may be electrically connected to an adjacent first main pattern 21. Each of the second main patterns 31 may be electrically connected to an adjacent second main pattern 31. Each of the first main patterns 21 and each of the second main patterns 31 may be defined as a first unit conductive pattern.

The first main patterns 21 and the second main patterns 31 may be formed on the flat regions 11 shown in FIGS. 1 and 2.

A plurality of sub-patterns 40 may be formed in the bending region 13 shown in FIGS. 1 and 2. As shown in FIG. 3, the sub-pattern 40 may include a first sub-pattern 51, a second sub-pattern 61, and a third sub-pattern 71.

Each of the first sub-patterns 51 may be electrically connected to an adjacent first sub-pattern 51. Each of the second sub-patterns 61 may be electrically connected to an adjacent second sub-pattern 61. Each of the first sub-pattern 51, the second sub-pattern 61, and the third sub-pattern 71 may be defined as a second unit conductive pattern.

A touch pixel may be configured by the first unit conductive pattern and the second unit conductive pattern. The first unit conductive pattern and the second unit conductive pattern may be simultaneously formed of the same material.

The first sub-pattern 51 and the second sub-pattern 61 may intersect at a crossing region 45. The first sub-pattern 51 and the second sub-pattern 61 may intersect at the crossing region 45 in an electrically insulated state.

A first connection electrode 53 may be formed between adjacent first sub-patterns 51. The first connection electrode 53 may be formed in the crossing region 45. The first connection electrode 53 may electrically connect the adjacent first sub-patterns 51.

The first sub-pattern 51 and the first connection electrode 53 may be formed of the same material. The first sub-pattern 51 and the first connection electrode 53 may be integrally formed.

The first sub-pattern 51, the second sub-pattern 61, and the first connection electrode 53 may be simultaneously formed in the same layer.

A bridge electrode 63 may be formed between adjacent second sub-patterns 51. The bridge electrode 63 may be formed in the crossing region 45. The bridge electrode 63 may electrically connect the adjacent second sub-patterns 61.

The first connection electrode 53 and the bridge electrode 63 may intersect each other. The first connection electrode 53 and the bridge electrode 63 may intersect at the crossing region 45. The first connection electrode 53 and the bridge electrode 63 may intersect in a state of being insulated from each other. An insulating layer may be formed between the first connection electrode 53 and the bridge electrode 63, and thus the first connection electrode 53 and the bridge electrode 63 may be electrically separated.

The third sub-pattern 71 may be arranged between first sub-patterns 51 which are adjacent to each other in the second direction. Alternately, the third sub-pattern 71 may be arranged between second sub-patterns 61 which are adjacent to each other in the first direction.

The plurality of third sub-patterns 71 may be arranged in the first direction. The third sub-pattern 71 may be arranged between adjacent second sub-patterns 61. The second sub-pattern 61 may be arranged between adjacent third sub-patterns 71.

The third sub-pattern 71 may be electrically connected to any one among the adjacent second sub-patterns 61. A second connection electrode 73 may be formed between the second sub-pattern 61 and the third sub-pattern 71. The second sub-pattern 61 and the third sub-pattern 73 may be electrically connected through the second connection electrode 73.

The second sub-pattern 61, the third sub-pattern 71, and the second connection electrode 73 may be formed of the same material. The second sub-pattern 61, the third sub-pattern 71, and the second connection electrode 73 may be integrally formed.

The second sub-pattern 61 and the third sub-pattern 71 which are electrically connected may sense the same touch. The second sub-pattern 61 and the third sub-pattern 71 may be electrically connected, and thus a sensing region in the touch panel 1 may be extended. That is, even when there is a touch input in a region adjacent to the third sub-pattern 71, a spatial resolution of the touch input may be improved since the touch input is sensed. Further, the sub-pattern 40 may be prevented from being visually recognized from the outside by a difference of refractive index or reflectivity according to whether there is a pattern or not by forming the sub-pattern 40 to have a uniform size without an empty region.

The first and second main patterns 21 and 31 and the sub-pattern 40 may have the same shape. The first and second main patterns 21 and 31 and the sub-pattern 40 may have a rhombic shape.

The first and second main patterns 21 and 31 and the sub-pattern 40 may be formed to have widths different from each other. The widths of the first and second main patterns 21 and 31 and the sub-pattern 40 may be defined as a diagonal length of the rhombic shape. The first and second main patterns 21 and 31 may be formed to have a first width d1, and the sub-pattern 40 may be formed to have a second width d2.

The second width d2 may be smaller than the first width d1. The second width d2 may be a value of a half of the first width d1. A crack of the sub-pattern 40 capable of occurring in the bending region 13 shown in FIGS. 1 and 2 may be prevented by forming the second width d2 to be smaller than the first width d1. That is, in the sub-pattern 40 formed in the bending region 13, there may be a problem in which a tension acts on an opposite region of the substrate 10 of the sub-pattern 40 by the curvature, and thus the crack occurs in the sub-pattern 40, but the crack occurring in the sub-pattern 40 may be prevented by forming the second width d2 of the sub-pattern 40 to be smaller than the first width d1.

Since the crack occurring in the sub-pattern 40 is prevented and the sub-pattern 40 is prevented from being electrically opened by the crack, a defect of the touch panel 1 occurring in the bending region 13 may be prevented.

The second width d2 may have a value of $\pi R/10$ to $\pi R/2$ when the radius of curvature of the bending region 13 is defined as R like the substrate 10 shown in FIG. 1.

When forming the second width d2 to have a size which is greater than $\pi R/2$, since the tension applied to an outer surface of the sub-pattern 40 is not decreased by the curvature, the crack may occur in the sub-pattern 40, and thus a defect in the touch panel 1 may occur.

Further, when forming the second width d2 to have a width which is smaller than $\pi R/10$, a level of difficulty of a process may be increased, a manufacturing yield may be decreased, and a manufacturing cost may be increased.

Moreover, when the number of the sub-patterns 40 is identical and only the second width d2 of the sub-pattern is decreased, the region in which the sub-pattern 40 is not formed may be increased in the bending region 13, and the sub-pattern 40 may be visually recognized from the outside by the difference of refractive index or the reflectivity according to whether there is a pattern or not.

Moreover, when the second width d2 of the sub-pattern 40 is decreased and the number of sub-patterns 40 is increased as much as the decreased second width d2, there may be a problem in which a size of the ineffective region UA in which the wiring pattern is formed is increased since the number of wiring patterns connected to the sub-pattern 40 is increased. When the size of the ineffective region UA is increased, it may not satisfy a requirement of a recent technology called a narrow bezel since a bezel region is increased.

A connection electrode and a bridge electrode of the first main pattern 21 and the second main pattern 31 may be also formed in a crossing region of the first main pattern 21 and the second main pattern 31, like the sub-pattern 40. Since the crossing region of the first main pattern 21 and the second main pattern 31 has a structure similar to the crossing region 45 of the sub-pattern 40, a detailed description will be omitted.

The second main pattern 31 may be arranged along the same second direction as the second sub-pattern 61, and the second main pattern 31 and the second sub-pattern 61 which are formed in the same column may be electrically connected. The second main pattern 31 and the second sub-pattern 61 may be electrically connected by the bridge electrode 63.

As shown in FIG. 2, a plurality of wiring patterns may be formed in the ineffective region UA. A plurality of first wiring patterns 91 and a plurality of second wiring patterns 93 may be formed in the ineffective region UA of the substrate 10.

The first sensing electrode 20 may be electrically connected to the first wiring pattern 91. The first sensing electrode 20 may be formed to be integrated with the first wiring pattern 91, or the first sensing electrode 20 may be formed to be separated from the first wiring pattern 91.

The second sensing electrode 30 may be electrically connected to the second wiring pattern 93. The second sensing electrode 30 may be formed to be integrated with the second wiring pattern 93, or the second sensing electrode 30 may be formed to be separated from the second wiring pattern 93.

The first and second sensing electrodes 20 and 30 and the first and second wiring patterns 91 and 93 may include a conductive material. The first and second sensing electrodes 20 and 30 may be formed of a transparent conductive material.

The first and second sensing electrodes 20 and 30 may include at least one conductive material selected among the group consisting of an indium tin oxide (ITO), an indium zinc oxide (IZO), a copper oxide, a carbon nano tube (CNT), a metal mesh, an argentum nano wire, 3,4-ethylenedioxythiophene (PEDOT: poly styrene sulfonate (PSS)), and a nano fiber.

A plurality of auxiliary electrodes 80 may be formed on the first and second sensing electrodes 20 and 30 as shown in FIG. 3.

The auxiliary electrode 80 may include a first auxiliary electrode 81, a second auxiliary electrode 83, and a third auxiliary electrode 85.

The first auxiliary electrode 81 may be formed on the first sensing electrode 20. The first auxiliary electrode 81 may be formed on the first main pattern 21 and the first sub-pattern 51. The first auxiliary electrode 81 may be formed along the first direction which is an arrangement direction of the first main pattern 21 and the first sub-pattern 51. The first auxiliary electrode 81 may be formed in center regions of the first main pattern 21 and the first sub-pattern 51.

The first auxiliary electrode 81 may be electrically connected to the first sensing electrode 20. The first auxiliary electrode 81 may be formed to be electrically separated from the second auxiliary electrode 83. A resistance of the first sensing electrode 20 may be decreased by the first sensing electrode 20 acting as a moving path of a charge by forming the first auxiliary electrode 81 on the first sensing electrode 20. As the resistance of the first sensing electrode 20 is decreased, an RC delay is decreased, and a response speed is improved and touch sensitivity is increased since a distortion of a signal is prevented.

As the first auxiliary electrode 81 is formed on the first sub-pattern 51, the first auxiliary electrode 81 may act as an auxiliary moving path of the charge even when a crack occurs in the first sub-pattern 51, and thus a defect in the touch panel 1 may be prevented. Further, as the first auxiliary electrode 81 is formed on the first sub-pattern 51, a crack occurring by tension applied to an upper surface of the first sub-pattern 51 may be prevented.

The second auxiliary electrode 83 may be formed on the second sensing electrode 30. The second auxiliary electrode 83 may be formed on the second main pattern 31, the second sub-pattern 61, and the bridge electrode 63. The second auxiliary electrode 83 may be formed along the second direction which is the arrangement direction of the second main pattern 31 and the second sub-pattern 61. The second auxiliary electrode 83 may be formed in center regions of the second main pattern 31, the second sub-pattern 61, and the bridge electrode 63.

The second auxiliary electrode 83 may be electrically connected to the first sensing electrode 20. The second auxiliary electrode 83 may be electrically connected to the second main pattern 31, the second sub-pattern 61, and the bridge electrode 63. The second auxiliary electrode 83 formed in the second main pattern 31, the second sub-pattern 61, and the bridge electrode 63 may be integrally formed. The second auxiliary electrode 83 may be formed to be electrically separated from the first auxiliary electrode 81.

A resistance of the second sensing electrode 30 may be decreased by the second sensing electrode 30 acting as a moving path of a charge by forming the second auxiliary electrode 83 on the second sensing electrode 30. As the resistance of the second sensing electrode 30 is decreased, an RC delay may be decreased and a response speed may be improved, and thus touch sensitivity may be increased since a distortion of a signal is prevented.

As the second auxiliary electrode 83 is formed on the second sub-pattern 61, the second auxiliary electrode 83 may act as an auxiliary moving path of the charge even when a crack occurs in the second sub-pattern 61, and thus a defect in the touch panel 1 may be prevented. A crack by tension applied to an upper surface of the second sub-pattern 61 may be prevented by forming the second auxiliary electrode 83 on the second sub-pattern 61. In detail, since a direction of the tension applied to the second sub-pattern 61 is in parallel with the arrangement direction of the second auxiliary electrode 83, the tension applied to the second sub-pattern 61 may be decreased by the second auxiliary electrode 83, and thus the defect in the touch panel 1 may be prevented.

Further, although not shown, since the second main pattern 31 and the second sub-pattern 61 are electrically connected through the second auxiliary electrode 83, the bridge electrode 63 may be omitted. That is, since adjacent second main patterns 31 and adjacent second sub-patterns 61 are electrically connected through the second auxiliary electrode 83 without the bridge electrode 63, a manufacturing cost may be reduced.

The third auxiliary electrode 85 may be formed on the third sub-pattern 71. The third auxiliary electrode 85 may be formed along the first direction. The third auxiliary electrode 85 may be formed in the center region of the third sub-pattern 71. The third auxiliary electrode 85 may be formed by being extended from the third sub-pattern 71 to the second sub-pattern 61. Further, the third auxiliary electrode 85 may be formed by being extended on the second connection electrode 73 connecting the second sub-pattern 61 and the third sub-pattern 71.

The third auxiliary electrode 85 may be electrically connected to the third sub-pattern 71. The third auxiliary electrode 85 may be electrically connected to the second auxiliary electrode 83. One end of the third auxiliary electrode 85 may be electrically connected by being in contact with the second auxiliary electrode 83. As the third auxiliary electrode 85 is formed on the third sub-pattern 71, a resistance of the third sub-pattern 71 may be decreased by the third sub-pattern 71 acting as a moving path of a charge. As the resistance of the third sub-pattern 71 is decreased, an RC delay may be decreased, and a response speed may be improved and touch sensitivity may be increased since a distortion of a signal is prevented.

As the third auxiliary electrode 85 is formed on the third sub-pattern 71, the third auxiliary electrode 85 may act as an auxiliary moving path of the charge even when a crack occurs in the third sub-pattern 71, and thus a defect in the touch panel 1 may be prevented. As the third auxiliary electrode 85 is formed on the third sub-pattern 71, the crack occurring by tension applied to an upper surface of the third sub-pattern 71 may be prevented.

Further, although not shown, since the second sub-pattern 61 and the third sub-pattern 71 are electrically connected through the third auxiliary electrode 85, the second connection electrode 73 may be omitted. That is, since an adjacent second sub-pattern 61 and third sub-pattern 71 are electrically connected without the second connection electrode 73, a manufacturing cost may be reduced.

The auxiliary electrode 80 may be formed of a transparent conductive material. When the auxiliary electrode 80 includes the transparent conductive material, the auxiliary electrode 80 may include at least one conductive material selected among the group consisting of an ITO, an IZO, a copper oxide, a CNT, a metal mesh, an argentum nano wire, PEDOT (PSS), and a nano fiber.

Further, the auxiliary electrode 80 may include a low resistive metal material. When the auxiliary electrode 80 includes the low resistive metal material, the auxiliary electrode 80 may include at least one selected from the group consisting of chromium (Cr), nickel (Ni), aluminum (AL), platinum (Pt), aurum (Au), tungsten (W), copper (Cu), and molybdenum (Mo).

The auxiliary electrode 80 may be formed of the same material as the first wiring pattern 91 and the second wiring pattern 93. The auxiliary electrode 80 may be formed using the same process as the first wiring pattern 91 and the second wiring pattern 93. The auxiliary electrode 80 may be simultaneously formed together with the first wiring pattern 91 and the second wiring pattern 93. When the auxiliary electrode 80 is simultaneously formed together with the first wiring pattern 91 and the second wiring pattern 93, a process may be simplified since a separate process of forming the auxiliary electrode 80 is omitted, a manufacturing cost may be reduced, and a manufacturing yield may be improved.

FIG. 4 is an enlarged view illustrating a touch panel according to a second embodiment of the present invention.

The touch panel according to a second embodiment of the present invention may include a sensing electrode having a different shape compared with the first embodiment of the present invention, and the remaining elements may have the same structure. Accordingly, when describing the second embodiment of the present invention, the same reference numeral may be given to the same element as shown in the first embodiment, and a detailed description thereof will be omitted.

Referring to FIG. 4 together with FIGS. 1 and 2, as shown in FIG. 2, the first sensing electrode 20 and the second sensing electrode 30 may be formed on the substrate 10 of a touch panel 1 according to the second embodiment of the present invention.

As shown in FIG. 4, the first sensing electrode 20 may include the plurality of first main patterns 21 and the plurality of first sub-patterns 51, and the second sensing electrode 30 may include the plurality of second main patterns 31 and the plurality of second sub-patterns 61.

The substrate 10 may include the flat region 11 and the bending region 13 as shown in FIGS. 1 and 2.

The first main patterns 21 and the second main patterns 31 may be formed in the flat region 11, and the sub-patterns 40 may be formed in the bending region 13. Referring to FIG. 4 again, the sub-pattern 40 may include the first sub-pattern 51, the second sub-pattern 61, and the third sub-pattern 71.

A first opening region 23 may be formed in the first main pattern 21. The first opening region 23 may be formed in a center region of the first main pattern 21. The first opening region 23 may be formed to penetrate through the first main pattern 21. The first opening region 23 may be formed in an X shape by being extended in a direction of a surface facing the first main pattern 21 having a rhombic shape.

The first main pattern 21 may be formed to have a plurality of first divided electrode patterns 25 by being divided by the first opening region 23. As the first main pattern 21 is divided, four first divided electrode patterns 25 may be formed. The plurality of first divided electrode patterns 25 may have sizes corresponding to each other. The first divided electrode pattern 25 may have a size corresponding to the sub-pattern 40. The first divided electrode pattern 25 may have a shape corresponding to the sub-pattern 40.

The plurality of divided electrode patterns 25 divided by one first main pattern 21 may be electrically connected to an adjacent first divided electrode pattern 25. The plurality of first divided electrode patterns 25 may be electrically connected through a plurality of first connection portions 27. The plurality of first connection portions 27 may be located in an edge region remaining after the first opening region 23 is formed in the center region of the first main pattern 21.

The first connection portion 27 may be formed in the edge region and the center region of the first main pattern 21 before it's divided. The first connection portion 27 may be formed in a region corresponding to the first auxiliary electrode 81. The first connection portion 27 may be formed in a region corresponding to the first auxiliary electrode 81, and support the first auxiliary electrode 81.

The first connection portion 27 may electrically connect the plurality of first divided electrode patterns 25 of one first main pattern 21, and the plurality of first divided electrode patterns 25 may act as one unit electrode pattern.

A second opening region 33 may be formed in the second main pattern 31. The second opening region 33 may be formed in the center region of the second main pattern 31. The second opening region 33 may be formed by penetrating through the second main pattern 31. The second opening region 33 may be formed in an X shape by being extended in a direction of a surface facing the second main pattern 31 having a rhombic shape.

The second main pattern 31 may form a plurality of second divided electrode patterns 35 by being divided by the second opening region 33. As the second main pattern 31 is divided, four second divided electrode pattern 35 may be formed. The plurality of second divided electrode patterns 35 may have sizes corresponding to each other. The second divided electrode pattern 35 may have a size corresponding to the sub-pattern 40. The second divided electrode pattern 35 may have a shape corresponding to the sub-pattern 40.

The plurality of second divided electrode patterns 35 divided by one second main pattern 31 may be electrically connected to an adjacent second divided electrode pattern 35. The plurality of second divided electrode patterns 35 may be electrically connected through a plurality of second connection portions 37. The plurality of second connection portions 37 may be located in an edge region remaining after the second opening region 33 is formed in the center region of the second main pattern 31.

The second connection portion 37 may be formed in the edge region and the center region of the second main pattern 31 before it's divided. The second connection portion 37 may be formed in a region corresponding to the second auxiliary electrode 83. The second connection portion 37 may be formed in a region corresponding to the second auxiliary electrode 83, and support the second auxiliary electrode 83.

The second connection portion 37 may electrically connect the plurality of second divided electrode patterns 35 of one second main pattern 31, and the plurality of second divided electrode patterns 35 may act as one unit electrode pattern.

The first divided electrode pattern 25 and the second divided electrode pattern 35 may be formed to have a size and a shape corresponding to the sub-pattern 40. Since the first divided electrode pattern 25 and the second divided electrode pattern 35 have the shape and the size corresponding to the sub-pattern 40, a deviation of an index of refraction or reflectivity may be prevented according to a difference of sizes of the first and second main patterns 21 and 31, and the sub-pattern 40. That is, since the first divided electrode pattern 25 and the second divided electrode pattern 35 have a size and a shape corresponding to the sub-pattern 40, the sub-pattern 40 may be prevented from being visually recognized from the outside.

Table 1 represents a change of the resistance of the touch panel according to the first embodiment and the second embodiment.

TABLE 1

| Classification | R = 3 mm | | R = 5 mm | |
|---|---|---|---|---|
| | Resistance change | Touch operation | Resistance change | Determination |
| Conventional art | 1000% | NG | 500% | NG |
| First embodiment | 107% | OK | 104% | OK |
| Second embodiment | 104% | OK | 102% | OK |
| First embodiment + auxiliary electrode | 100% | OK | 100% | OK |

TABLE 1-continued

| | R = 3 mm | | R = 5 mm | |
| --- | --- | --- | --- | --- |
| Classification | Resistance change | Touch operation | Resistance change | Determination |
| Second embodiment + auxiliary electrode | 100% | OK | 100% | OK |

The conventional art according to Table 1 represents a touch panel in which a main pattern and a sub-pattern are formed to have the same size, first embodiment represents a touch panel according to the first embodiment in which the auxiliary electrode was not formed, and second embodiment represents a touch panel according the second embodiment in which the auxiliary electrode was not formed. Further, a resistance test was performed on the first embodiment in which the auxiliary electrode was formed, and the second embodiment in which the auxiliary electrode was formed. Here, the change of the resistance was measured by being divided into a case in which the radius of curvature R was 3 mm and a case in which the radius of curvature R was 5 mm.

Referring to Table 1, in a touch panel according to the conventional art, when the radius of curvature was 3 mm, a resistance value was 1000%, and when the radius of curvature was 5 mm, the resistance value was 500%, and thus the touch panel was not normally operated.

When the radius of curvature was 3 mm, the resistance value was measured as 107% in the touch panel according to the first embodiment of the present invention in which the auxiliary electrode was not formed, and the resistance value was measured as 104% in the touch panel according to the second embodiment of the present invention in which the auxiliary electrode was not formed. Further, the resistance value was measured as 100% in a touch panel according to the first embodiment of the present invention in which the auxiliary electrode was formed, and the resistance value was formed is measured as 100% in a touch panel according to the second embodiment of the present invention in which the auxiliary electrode was formed, and thus the touch panel was normally operated without a large change of the resistance value.

When the radius of curvature was 5 mm, the resistance value was measured as 104% in the touch panel according to the first embodiment of the present invention in which the auxiliary electrode was not formed, and the resistance value was measured as 102% in the touch panel according to the second embodiment of the present invention in which the auxiliary electrode was not formed. Further, the resistance value was measured as 100% in the touch panel according to the first embodiment of the present invention in which the auxiliary electrode was formed, and the resistance value was measured as 100% in the touch panel according to the second embodiment of the present invention in which the auxiliary electrode was formed, and thus the touch panel was normally operated without a large change of the resistance value.

That is, in the touch panels according to the first embodiment and the second embodiment of the present invention, as a small crack occurs, the value of the resistance may not be increased, and thus the touch panel may be normally operated. Accordingly, a defect may be prevented in the touch panels according to the first embodiment and the second embodiment of the present invention.

FIG. 5 is an enlarged view illustrating a touch panel according to a third embodiment of the present invention.

A touch panel according to the third embodiment of the present invention may have a third auxiliary electrode having a different connection compared with the first embodiment of the present invention, and the remaining elements may have the same structure. Accordingly, when describing the third embodiment of the present invention, the same reference numeral may be given to the same element as shown in the first embodiment, and a detailed description thereof will be omitted.

Referring to FIG. 5 together with FIGS. 1 and 2, as shown in FIG. 2, the first sensing electrode 20 and the second sensing electrode 30 may be formed on the substrate 10 of a touch panel 1 according to the third embodiment.

The first sensing electrode 20 may include the plurality of first main pattern 21 and the plurality of first sub-patterns 51, and the second sensing electrode 30 may include the plurality of second main patterns 31 and the plurality of the second sub-patterns 61.

The substrate 10 may include the flat region 11 and the bending region 13 as shown in FIGS. 1 and 2.

The first main patterns 21 and the second main patterns 31 may be formed in the flat region 11. The sub-patterns 40 may be formed in the bending region 13. Referring to FIG. 5 again, the sub-pattern 40 may include the first sub-pattern 51, the second sub-pattern 61, and the third sub-pattern 71.

The first sub-pattern 51 may be formed in the first direction, and the second sub-pattern 61 may be formed in the second direction.

The third sub-pattern 71 may be arranged between first sub-patterns 51 adjacent in the second direction. Alternatively, the third sub-pattern 71 may be arranged between second sub-patterns 61 adjacent in the first direction.

The plurality of third sub-patterns 71 may be arranged in the first direction. The third sub-pattern 71 may be arranged between adjacent second sub-patterns 61. The second sub-pattern 61 may be arranged between adjacent third sub-patterns 71.

The third sub-pattern 71 may have a structure which is not electrically connected. The third sub-pattern 71 may not be connected to any adjacent sub-pattern 40. The third sub-pattern 71 may act as a dummy electrode without an electrical connection.

The sub-pattern 40 may be prevented from being visually recognized from the outside by a difference of refractive index or reflectivity according to whether there is a pattern or not by forming the sub-pattern 40 to have a uniform size without an empty region in the bending region 13 by the third sub-pattern 71.

FIG. 6 is a perspective view illustrating a display device to which the touch panel is applied according to an embodiment of the present invention.

Referring to FIG. 6, an input button 1100 for inputting a command from the outside, a camera 1200 for capturing a still image, and a moving image, and a speaker 1300 for outputting a sound may be formed in a display device 1000.

The display device 1000 may include the touch panel 1 described above and a display panel (not shown). The touch panel 1 may be formed on a front side of the display panel (not shown). The display panel (not shown) may be attached to the touch panel 1.

The display panel (not shown) may display an image. The display panel (not shown) may be a liquid crystal display (LCD) panel, or an organic light emitting display (OLED) panel, and be applied to various products such as a mobile phone, a television (TV), and a navigation device, etc.

An example in which a device to which the touch panel according to embodiments of the present invention is applied is the display device was described, but the device to which the touch panel according to the embodiments of the present invention is applied is not limited thereto, and the touch panel may be applied to various products such as a keypad, a touch pad for a notebook computer, a touch input device for a vehicle, etc.

The touch panel according to the embodiments of the present invention may prevent a crack by forming the pattern having a smaller width than the flat region in the bending region.

The touch panel according to the embodiments of the present invention may improve visibility by forming divided electrode patterns in the flat region.

The touch panel according to the embodiments of the present invention may improve the visibility by forming a pattern having the same density as the flat region in the bending region.

While the configuration and the features of the present invention are described based on the above-described embodiments, the present invention is not limited thereto, and it should be apparent to those skilled in the art that various modifications can be made to the above-described embodiments of the present invention without departing from the spirit or scope of the invention. Thus, it is intended that the present invention covers all such modifications provided they come within the scope of the appended claims and their equivalents.

What is claimed is:

1. A flexible touch panel having a bending region which is bendable and a flat region, comprising:
    a plurality of first unit conductive patterns formed in the flat region;
    a plurality of second unit conductive patterns formed in the bending region, the plurality of second unit conductive patterns comprise a plurality of first sub-patterns arranged in a first direction, a plurality of second sub-patterns arranged in a second direction and a plurality of third sub-patterns arranged between second sub-patterns, wherein each of third sub-pattern is electrically connected to adjacent second sub-pattern through a connection electrode, wherein each of third sub-pattern, the adjacent second sub-pattern and the connection electrode is integrally formed;
    a plurality of first auxiliary electrodes arranged in a first direction, each of first auxiliary electrodes is formed on each of the first sub-pattern; and
    a bridge electrode electrically connected adjacent second sub-patterns, the bridge electrode is disposed between adjacent first auxiliary electrodes,
    wherein a second unit conductive pattern of the plurality of second unit conductive patterns has a smaller width than a first unit conductive pattern of the plurality of first unit conductive patterns.

2. The flexible touch panel of claim 1, wherein the bending region is bended to have a radius of curvature R.

3. The flexible touch panel of claim 2, wherein the second unit conductive pattern has a width of $\pi R/10$ to $\pi R/2$.

4. The flexible touch panel of claim 1, wherein the first unit conductive pattern comprises a plurality of divided patterns divided to have a size corresponding to the second unit conductive pattern.

5. The flexible touch panel of claim 4, wherein each of the divided patterns is electrically connected to adjacent divided patterns by a connection portion.

6. The flexible touch panel of claim 5, wherein the connection portion is formed to have a plurality of portions between adjacent divided patterns.

7. The flexible touch panel of claim 4, wherein the plurality of divided patterns and the connection portion are integrally formed.

8. The flexible touch panel of claim 1, further comprising:
    a second auxiliary electrode formed on the second sub-pattern.

9. The flexible touch panel of claim 1, further comprising:
    a third auxiliary electrode electrically connected to the second auxiliary electrode.

* * * * *